United States Patent
Lee

(10) Patent No.: US 7,289,290 B2
(45) Date of Patent: Oct. 30, 2007

(54) METHOD OF CONTROLLING TRACK SEEK SERVO IN DISK DRIVE AND APPARATUS THEREFOR

(75) Inventor: Sang-cheol Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 255 days.

(21) Appl. No.: 10/968,126

(22) Filed: Oct. 20, 2004

(65) Prior Publication Data

US 2005/0094309 A1   May 5, 2005

(30) Foreign Application Priority Data

Oct. 31, 2003   (KR) .................. 10-2003-0076731

(51) Int. Cl.
*G11B 5/596* (2006.01)
(52) U.S. Cl. ................. 360/78.06; 360/78.07
(58) Field of Classification Search ........... 360/78.09
See application file for complete search history.

(56) References Cited

U.S. PATENT DOCUMENTS

| | | | | |
|---|---|---|---|---|
| 5,073,748 A * | 12/1991 | Boehm | ............ | 318/569 |
| 5,638,267 A | 6/1997 | Singhose et al. | ......... | 364/148 |
| 5,901,009 A | 5/1999 | Sri-Jayantha et al. | .... | 360/78.07 |
| 6,046,898 A | 4/2000 | Seymour et al. | ............ | 361/113 |
| 6,208,671 B1 * | 3/2001 | Paulos et al. | .............. | 341/61 |
| 6,441,988 B2 * | 8/2002 | Kang et al. | ............ | 360/78.06 |
| 6,501,613 B1 | 12/2002 | Shih | ................. | 360/78.06 |
| 6,545,838 B1 * | 4/2003 | Burton | ............. | 360/78.06 |
| 6,549,364 B1 | 4/2003 | Shih | ................. | 360/78.06 |
| 6,560,059 B1 | 5/2003 | Hsin et al. | ............ | 360/78.04 |
| 6,762,571 B2 * | 7/2004 | Min et al. | .............. | 360/78.07 |
| 2003/0067710 A1 | 4/2003 | Kovonskaya et al. | .... | 360/78.06 |
| 2003/0095354 A1 * | 5/2003 | Atsumi et al. | .......... | 360/78.06 |
| 2003/0189784 A1 | 10/2003 | Galloway | .............. | 360/78.06 |
| 2003/0195643 A1 * | 10/2003 | Knirck et al. | ............ | 700/69 |
| 2006/0077588 A1 * | 4/2006 | Shih | ............... | 360/78.06 |
| 2006/0082922 A1 * | 4/2006 | Shih | ............... | 360/78.06 |

FOREIGN PATENT DOCUMENTS

| | | |
|---|---|---|
| JP | 2002-117636 | 4/2002 |
| KR | 010067380 A | 7/2001 |

* cited by examiner

*Primary Examiner*—Andrea Wellington
*Assistant Examiner*—Varsha A. Kapadia
(74) *Attorney, Agent, or Firm*—Staas & Halsey LLP

(57) ABSTRACT

A method of controlling a track seek servo in a hard disk drive and an apparatus therefor. A method of controlling a track seek servo includes moving a transducer to a track with an acceleration trajectory generated by a convolution operation, a rate of change of acceleration of the transducer being zero at a beginning and an end of a track seek operation in a track seek mode.

23 Claims, 10 Drawing Sheets

METHOD OF CONTROLLING TRACK SEEK SERVO IN DISK DRIVE AND APPARATUS THEREFOR

CROSS-REFERENCE TO RELATED APPLICATION

This application claims the priority of Korean Patent Application No. 2003-76731, filed on Oct. 31, 2003, in the Korean Intellectual Property Office, the disclosure of which is incorporated herein by reference.

BACKGROUND OF THE INVENTION

1. Field of the Invention

The present invention relates to a method of controlling a hard disk drive and an apparatus therefor, and more particularly, to a method of controlling a track seek servo in a hard disk drive and an apparatus therefor capable of reducing acoustic noise and track seek time.

2. Description of Related Art

A hard disk drive includes magnetic transducers for reading and writing information by sensing magnetic fields of disks and magnetizing the disks, respectively. The information is written in sectors along annular tracks on disk surfaces. There are number of tracks located across each surface of the disk. A group of tracks vertically aligned on the disks are collectively referred to as a cylinder. Accordingly, a track may be identified by a cylinder number.

Each transducer is typically integrated into a slider which is incorporated into a head gimbal assembly (HGA). The HGA is attached to an actuator arm which has a voice coil. The voice coil is located adjacent to a magnetic assembly to define a voice coil motor (VCM). The hard disk drive includes a driving circuit for applying a current to excite the VCM, and a controller. The excited VCM rotates the actuator arm to move the transducer across the disk surface.

When information is read/written, the hard disk drive may perform a seek routine which directs the transducer to move from one cylinder to another cylinder. During the seek routine, the VCM is excited by a current used to move the transducer to a new position on the disk surface. In addition, the controller performs a servo routine that ensures the transducer accurately moves to a cylinder and the center of the track.

It is desirable to minimize the time taken to read/write the information from/to the disks. Therefore, it is also desirable that the seek routine move the transducer to the new cylinder in the shortest possible time. In addition, it is desirable to minimize a settling time for the HGA so that the transducer can speedily read/write information from/to the disk and move to the new cylinder in one time.

Generally, a square waveform acceleration trajectory is employed to control a seek servo in order to speedily move the transducer to a desired track. Unfortunately, since a square wave contains high frequency harmonics which stimulate mechanical resonance in the HGA, the square waveform acceleration excites mechanical components or assemblies with high natural frequencies. This results in acoustic noise, undesirable vibration, and the associated settling time due to residual vibration. The mechanical resonance stimulated by the square waveform acceleration of the related art tends to increase both the settling time and overall time required to read/write the information from/to the disk.

There is proposed a track seek method using a sinusoidal acceleration trajectory in order to solve the aforementioned problems. The associated sinusoidal acceleration, velocity, and position equations are represented as follows.

$$a(t) = K_A I_M \sin\left(\frac{2\pi}{T_{sk}}t\right)$$
$$v(t) = \frac{K_A I_M T_{sk}}{2\pi}\left[1 - \cos\left(\frac{2\pi}{T_{sk}}t\right)\right]$$
$$x(t) = \frac{K_A I_M T_{sk}}{2\pi}\left[t - \frac{T_{sk}}{2\pi}\sin\left(\frac{2\pi}{T_{sk}}t\right)\right]$$

[Equation 1]

where $K_A$, $I_M$, and $T_{sk}$ denote an acceleration constant, current amplitude, and track seek time, respectively.

In the track seek method using the sinusoidal acceleration trajectory, the track seek time increases by about 10% in comparison with a track seek method using a square waveform acceleration trajectory. In addition, in the method using the sinusoidal acceleration trajectory, jerks occur at the beginning and end of a track seek, so acoustic noise and vibration are still generated.

As used herein, the term "jerk" refers to a sudden abrupt motion and can be represented by the derivative of acceleration, that is, the rate of change of acceleration. As described above, the jerks occurring at the beginning and end of a track seek cause acoustic noise and vibration.

In the track seek method using the square waveform acceleration trajectory, jerks occurring at the beginning and end of a track seek have infinite values as shown in Equation 2 below.

$$|j(0)|=|j(T_{sk})|=\infty \qquad \text{[Equation 2]}$$

In the track seek method using the sinusoidal acceleration trajectory, jerks occurring at the beginning and end of a track seek have maximum values as shown in Equation 3 below.

$$j(t) = K_A I_M \frac{2\pi}{T_{sk}}\cos\left(\frac{2\pi}{T_{sk}}\right)$$
$$|j(0)| = |j(T_{sk})| = K_A I_M \frac{2\pi}{T_{sk}}$$

[Equation 3]

Thus, it is to be understood that a seek servo using the sinusoidal acceleration trajectory of Equation 1 experiences fewer jerks than a seek servo using the square waveform acceleration trajectory. However, in the seek servo using the sinusoidal acceleration trajectory, jerks still occur at the beginning and end of a track seek, so acoustic noise and vibration are generated.

In the track seek method using the sinusoidal acceleration trajectory, the sinusoidal acceleration trajectory is previously calculated and its large amount of data is stored in a memory of a microprocessor during a hard disk drive design course, and the data is used to generate the sinusoidal acceleration trajectory during operation of the hard disk drive. Therefore, there is a disadvantage in that a large capacity of the memory is required.

Another technique for reducing acoustic noise in a seek mode is disclosed in Korean Laid Open No. 2001-67380, entitled, "Generalized Fourier Seek Method And Apparatus For A Hard Disk Drive Servomechanism." According to the technique, seek time and acoustic noise are reduced by using a generalized Fourier seek acceleration trajectory. However, since a generalized Fourier series is represented by a sum of several sinusoidal functions, there is a need to store a table of the several sinusoidal functions in a separate memory.

Moreover, since jerks occurring at the beginning and end of a track seek are not considered, the jerks have values of zero at the beginning and end of the track seek, so acoustic noise and vibration still exist.

Generally, an object of a track seek servo in a hard disk drive is to minimize acoustic noise and vibration and move a head to a desired location in the shortest possible time. A so-called "bang-bang" seek controller using a square waveform acceleration trajectory is the most useful one for minimizing seek time but has difficulty in reducing acoustic noise and vibration. A so-called sinusoidal seek controller using a sinusoidal acceleration trajectory has an advantage in reducing acoustic noise and vibration, but it cannot efficiently utilize currents in comparison with the "bang-bang" seek controller. In the sinusoidal seek controller, the seek time increases by about 10%.

Both of the aforementioned conventional seek controllers have jerks at the beginning and end of a track seek, which cause acoustic noise and vibration.

An aspect of the present invention is to design a new acceleration trajectory capable of minimizing the jerks occurring at the beginning and end of a track seek, reducing acoustic noise and vibration, and improving seek performance. Now, the new acceleration trajectory according to the present invention will be described.

BRIEF SUMMARY

An embodiment of the present invention provides a method of controlling a track seek servo in a hard disk drive and an apparatus therefore, where a track seek is controlled by using an acceleration trajectory obtained by a convolution operation, so that track seek time and a required capacity of a memory can be reduced. In addition, jerks occurring at the beginning and end of a track seek are minimized, so that acoustic noise and vibration can be minimized.

According to an aspect of the present invention, there is provided a method of controlling a track seek servo, including moving a transducer to a track with an acceleration trajectory generated by a convolution operation, a rate of change of acceleration of the transducer being zero at a beginning and an end of a track seek operation in a track seek mode.

According to another aspect of the present invention, there is provided a method of controlling a track seek servo, including moving a transducer to a track by a track seek control process for applying a current to a voice coil. The current corresponds to an acceleration trajectory generated by a convolution operation, so that a rate of change of acceleration is zero at a beginning and an end of a track seek operation in a track seek mode.

According to still another aspect of the present invention, there is provided a track seek servo control apparatus in a hard disk drive, including: a seek trajectory generator which generates an acceleration trajectory by using a convolution operation, so that a rate of change of acceleration is zero at a beginning and an end of a track seek operation in a track seek mode, and which computes a design position, a velocity, and an acceleration by using the acceleration trajectory; a state estimator which determines a real position, a velocity, and an acceleration of a transducer moving over a disk; a first adder which subtracts the real position from the design position; a position control gain corrector which generates a position correction value by multiplying a specified position gain with an output of the first adder; a second adder which subtracts the real velocity from the sum of the design velocity and the position correction value; a velocity control gain corrector which generates a velocity correction value by multiplying a specified velocity gain with an output of the second adder; a third adder which generates an acceleration correction value by subtracting the real acceleration from the sum of the design acceleration and the velocity correction value; and an actuator which varies a current applied to a voice coil in accordance with the acceleration correction value.

According to another aspect of the present invention, there is provided a hard disk drive including: an actuator which moves a transducer across a surface of a disk; and a controller which controls the actuator to move the transducer to a track by applying a current to a voice coil, wherein the current corresponds to an acceleration trajectory generated by a convolution operation, so that a rate of change of acceleration is zero at a beginning and an end of a track seek operation in a track seek mode.

According to another aspect of the present invention, there is provided a hard disk drive including: an actuator which moves a transducer across a surface of a disk; and a controller which controls the actuator to move the transducer to a track with an acceleration trajectory generated by a convolution operation, so that a rate of change of acceleration is zero at a beginning and an end of a track seek operation in a track seek mode.

According to yet another aspect of the present invention, there is provided a method of track seeking in a hard disk drive, including: generating an acceleration trajectory via a convolution operation during a track seeking operation in the hard disk drive; and moving a transducer to a specified track of a disk according to the acceleration trajectory, the acceleration trajectory dictating that a rate of change of acceleration at a beginning and an end of a track seeking operation is zero.

According to another aspect of the present invention, there is provided a method of increasing a speed of a track seeking operation, including: moving a transducer to a track of a disk according to an acceleration trajectory generated by a convolution operation, the acceleration trajectory dictating that a rate of change of acceleration of the transducer is zero at a beginning and an end of a track seek operation, the convolution operation including the summing of products of two discrete signals $x[n]$ and $h[n]$; and modifying the two signals $x[n]$ and $h[n]$ according to the following:

$$x[n] = \begin{cases} c, & 0 \le n \le T \\ 0, & n < 0, n > T \end{cases}$$

$$h[n] = \begin{cases} n, & 0 \le n \le \frac{mT}{2} \\ mT - n, & \frac{mT}{2} < n \le mT \\ 0, & n < 0, n > mT \end{cases},$$

wherein c is a positive constant, and m is a constant between 0 and 1.

According to yet another aspect of the present invention, there is provided a method of minimizing noise during a seek servo tracking operation, including: generating an acceleration trajectory via a convolution operation, so that a rate of change of acceleration is zero at a beginning and an end of a track seek operation in a track seek mode; computing a design position, a velocity, and an acceleration by using the acceleration trajectory; determining a real position, a velocity, and an acceleration of a transducer moving over a disk; subtracting the real position from the design position to obtain a first output value; generating a position correction value by multiplying a specified position gain with the first output value; subtracting the real velocity from the sum of the design velocity and the position correction value to obtain a second output value; generating a velocity correction value by multiplying a specified velocity gain with the output value; generating an acceleration correction value by subtracting the real acceleration from the sum of the design acceleration and the velocity correction value; and varying a current applied to a voice coil in accordance with the acceleration correction value.

According to other aspects of the present invention, there are provided computer readable storage media encoded with processing instructions for causing a computer to execute the various methods of the aforementioned aspects of the present invention.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Figure 1:
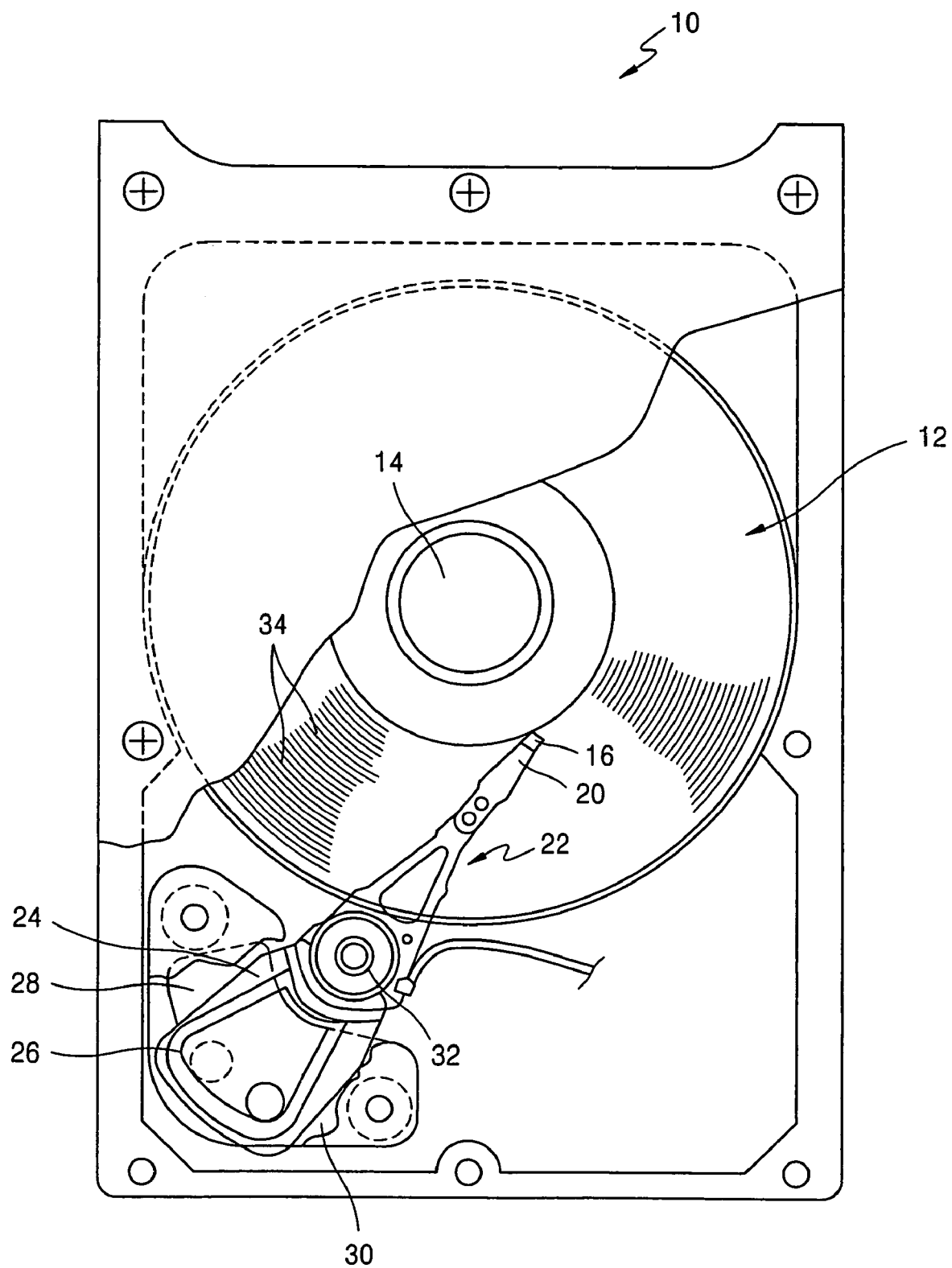
FIG. 1 is a top view of a hard disk drive usable with an embodiment of the present invention.

Reference will now be made in detail to an embodiment of the present invention, examples of which are illustrated in the accompanying drawings, wherein like reference numerals refer to the like elements throughout. The embodiment is described below in order to explain the present invention by referring to the figures.

Figure 7:
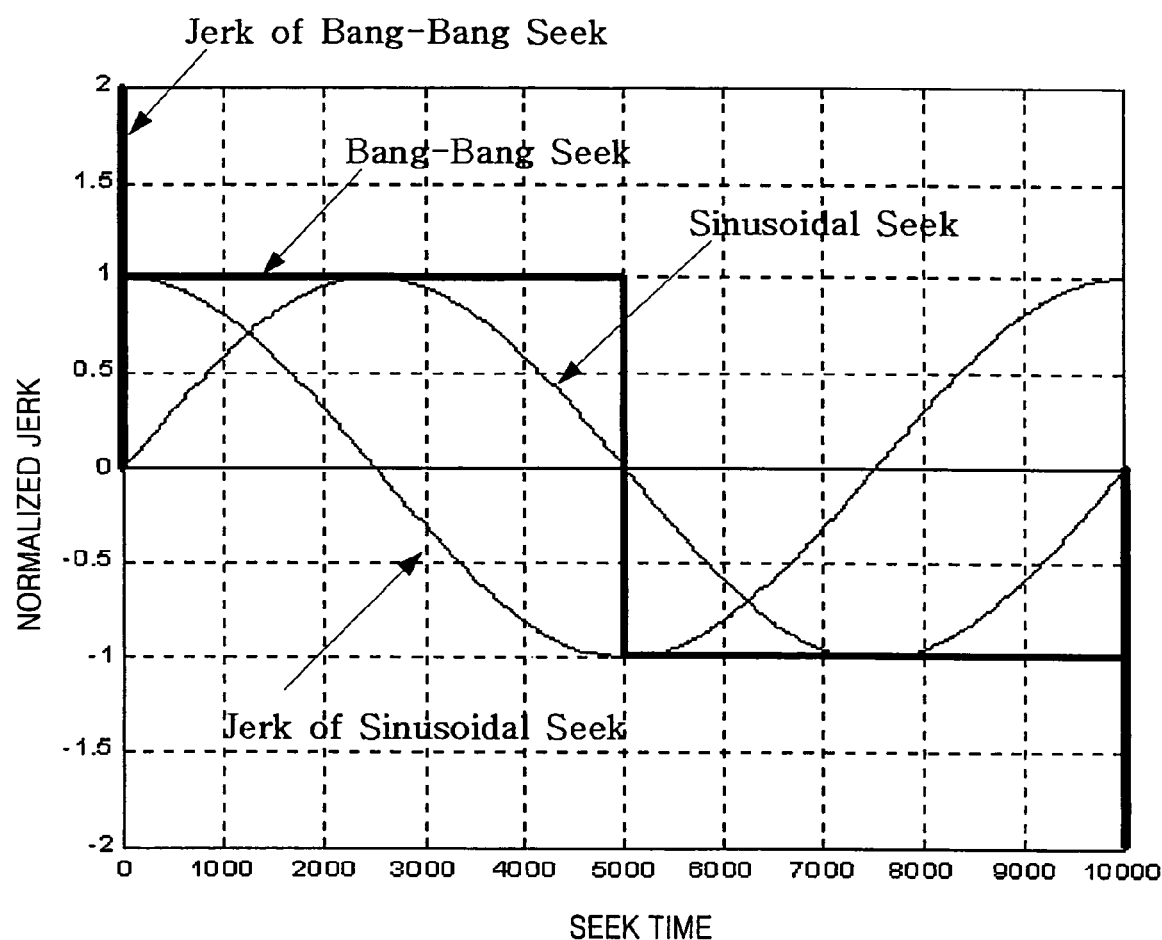
FIG. 7 illustrates acceleration and jerk trajectories according to the conventional art.

As described above, the term "jerk" refers to a sudden abrupt motion and can be represented by a derivative of acceleration of a motion, that is, a rate of change of acceleration of a motion. The larger the jerk is, the more the impact per time is exerted. If the jerk occurring at the beginning and end of a track seek is minimized, acoustic noise and vibration is reduced. As shown in FIG. 7, an infinite jerk value occurs in the "bang-bang" seek controller, and a cosine waveform of jerk occurs in the sinusoidal seek controller. In both controllers, the jerks cannot have values of zero at the beginning and end of a track seek.

According to the present embodiment, an acceleration trajectory is generated by performing a convolution operation. In order to minimize the jerks at the beginning and end of a track seek, the convolution operation is represented by Equation 4 below.

$$a_1[n] = \sum_{k=0}^{n} x[k]h[n-k] = x[n] * h[n], 0 \leq n \leq T \quad \text{[Equation 4]}$$

where n denotes a sample number within a seek region.

Figure 4:
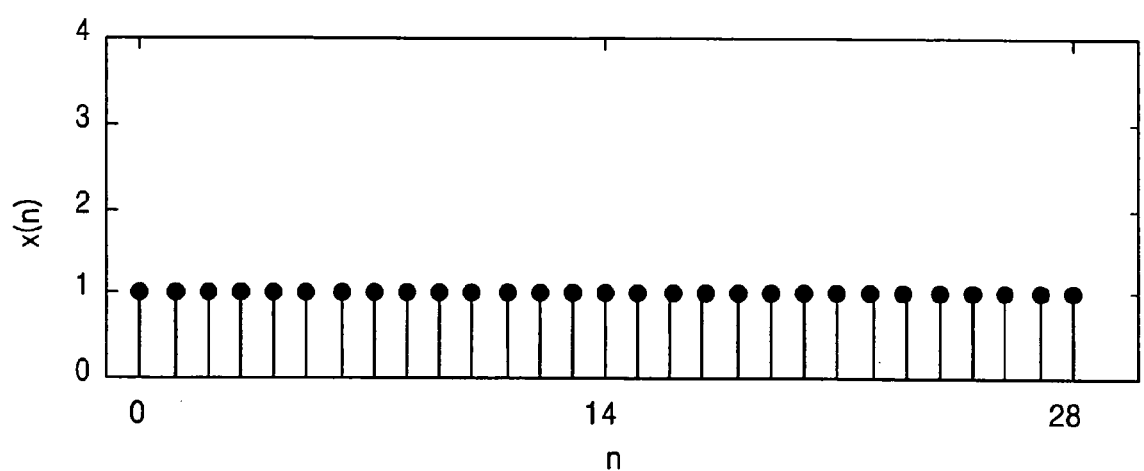
FIG. 4 illustrates waveforms of signals used to perform a convolution operation for generating an acceleration trajectory according to an embodiment of the present invention.
Figure 4:
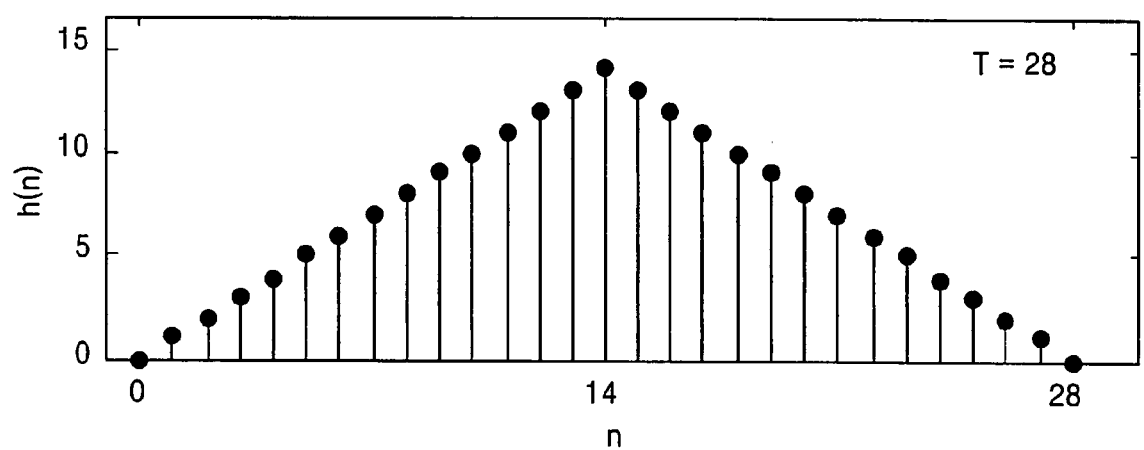

The functions $x[n]$ and $h[n]$ used in the convolution operation of Equation 4 may have waveforms shown in FIG. 4, which are represented by Equation 5 below. In FIG. 4, T=28.

$$x[n] = \begin{cases} 1, & 0 \leq n \leq T \\ 0, & n < 0, n > T \end{cases} \quad \text{[Equation 5]}$$

$$h[n] = \begin{cases} n, & 0 \leq n \leq \frac{T}{2} \\ T-n, & \frac{T}{2} < n \leq T \\ 0, & n < 0, n > T \end{cases}$$

Figure 5A:
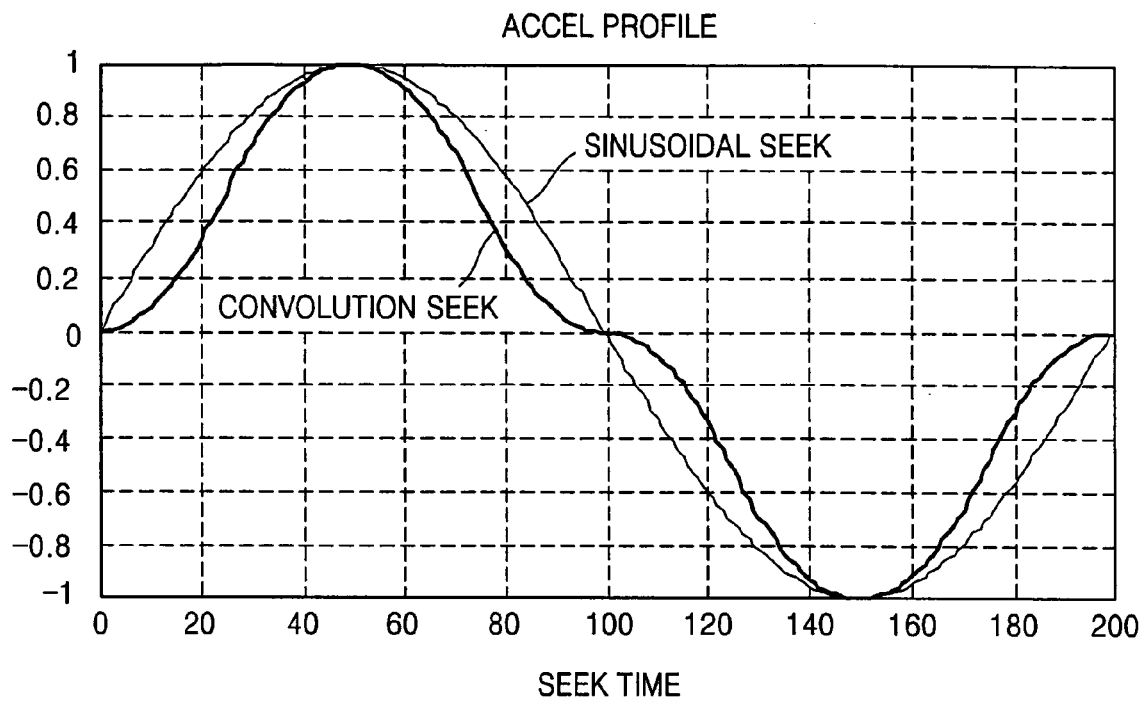
FIGS. 5A to 5D illustrate acceleration, velocity, position, and jerk trajectories obtained by applying Equation 5 to Equations 4, 6, and 7 according to the disclosed embodiment of the present invention.

In the convolution operation, the functions $x[n]$ and $h[n]$ represented by Equation 5 are applied to Equation 4. Then, an acceleration trajectory $a_1[n]$, a quarter of the overall acceleration trajectory, is obtained as shown in FIG. 5A. In FIG. 5A, T=50. The acceleration trajectory $a_1[n]$ corresponds to a half of an acceleration region in the overall acceleration trajectory. The acceleration trajectory $a_1[n]$ corresponds to the acceleration region, $0 \leq n \leq 50(T)$, which is within the total seek time, n=200(4T).

An acceleration trajectory $a_2[n]$ corresponding to a residual acceleration region, $50 < n \leq 100$, can be obtained by using the periodicity of the acceleration region, $0 < n \leq 50$, obtained in the convolution operation using Equations 4 and 5. The acceleration trajectory $a_2[n]$ is represented by Equation 6 below.

$$a_2[n] = a_1[2T-n], T < n \leq 2T \quad \text{[Equation 6]}$$

Acceleration trajectories $a_3[n]$ and $a_4[n]$ corresponding to a deceleration region, $100 < n \leq 200$, have opposite signs of and the same absolute value as the acceleration trajectories $a_1[n]$ and $a_2[n]$ corresponding to the acceleration region, $0 < n \leq 100$. The acceleration trajectories $a_3[n]$ and $a_4[n]$ corresponding to the deceleration region, $100 < n \leq 200$, are represented by Equation 7 below.

$$a_3[n] = -a_1[n-2T], 2T < n \leq 3T \quad \text{[Equation 7]}$$

$$a_4[n] = -a_1[4T-n], 3T < n \leq 4T$$

Figure 5B:
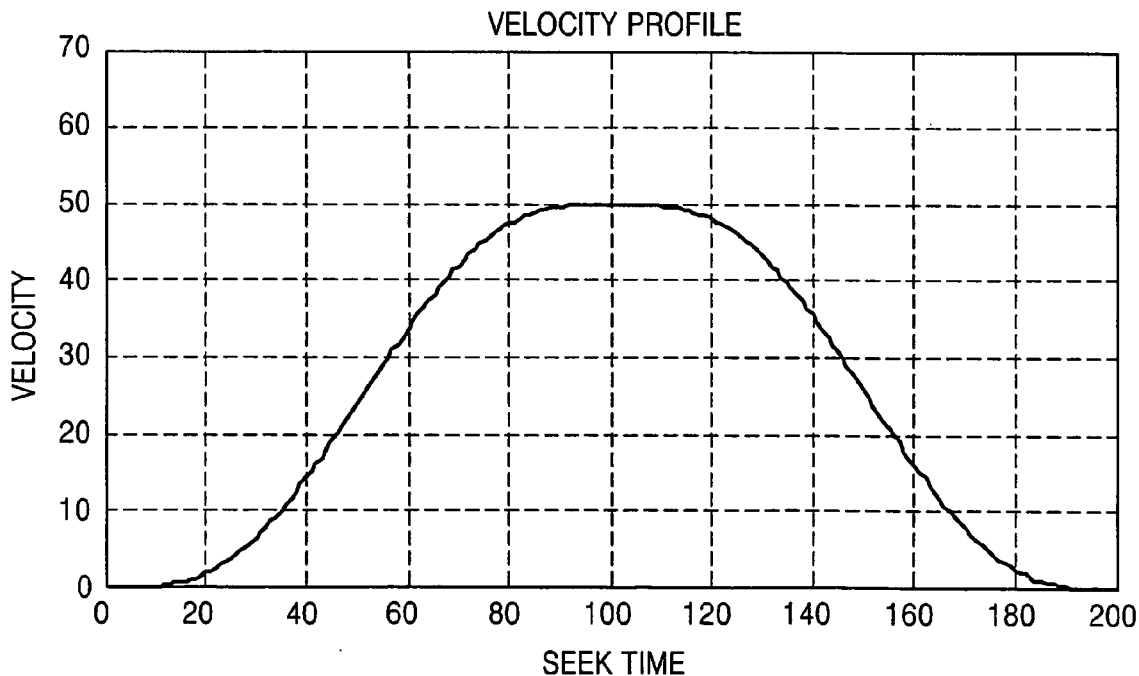
Figure 5C:
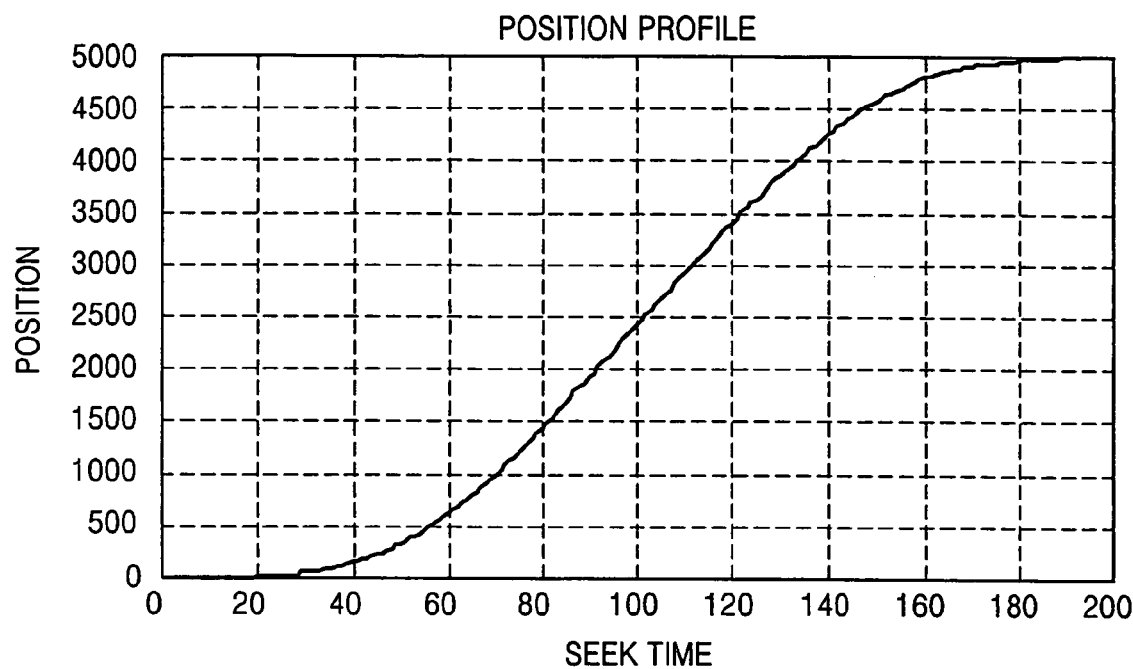
Figure 5D:
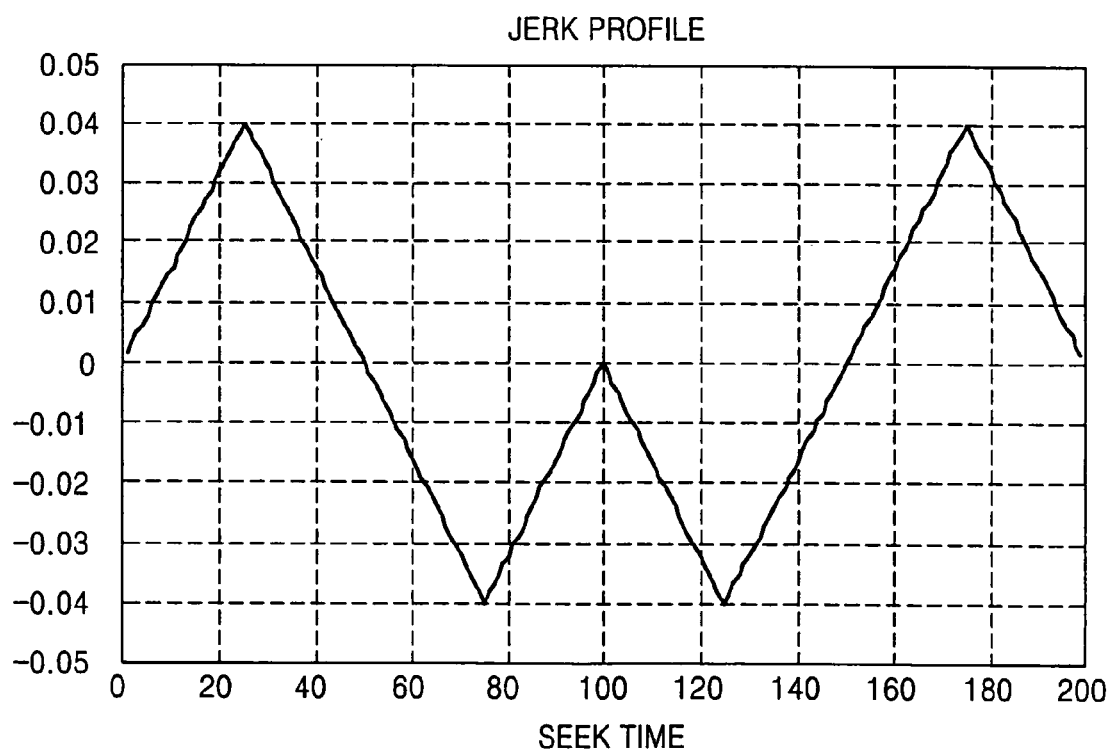

By integrating Equations 4, 6, and 7, a velocity trajectory can be obtained, as shown in FIG. 5B. By integrating the velocity trajectory, a position trajectory can be obtained, as shown in FIG. 5C. In addition, by differentiating Equations 4, 6, and 7, a jerk trajectory can be obtained, as shown in FIG. 5D.

As represented in Equation 4, the convolution operation is performed by summing products of two discrete signals. Accordingly, it is possible to reduce a required capacity of a memory and increase operating speed in comparison with a track seek method using a sinusoidal acceleration trajectory.

In particular, if the function x[n] is a unit step function as represented in Equation 5, a product operation is not needed and only the summation operation is performed in the convolution operation. Therefore, it is possible to further increase the operating speed.

However, when a track seek control process is performed by using the acceleration trajectory obtained by the convolution operation using Equation 5, a smaller current is consumed than the method using the sinusoidal trajectory. Accordingly, a track seek speed is lowered.

In order to further increase the track seek speed compared to the conventional method using the sinusoidal trajectory, there is a need to modify the two signals x[n] and h[n]. Modified signals x[n] and h[n] are represented by Equation 8 below.

$$x[n] = \begin{cases} c, & 0 \le n \le T \\ 0, & n < 0, n > T \end{cases}$$ [Equation 8]

$$h[n] = \begin{cases} n, & 0 \le n \le \frac{mT}{2} \\ mT - n, & \frac{mT}{2} < n \le mT \\ 0, & n < 0, n > mT \end{cases}$$

where c is a positive constant, and m is a constant between 0 and 1.

The constant c of the signal x[n] may be set 1 in order to remove the product operation in the convolution operation. In this case, the signal x[n] is represented by a unit step function.

Figure 6A:
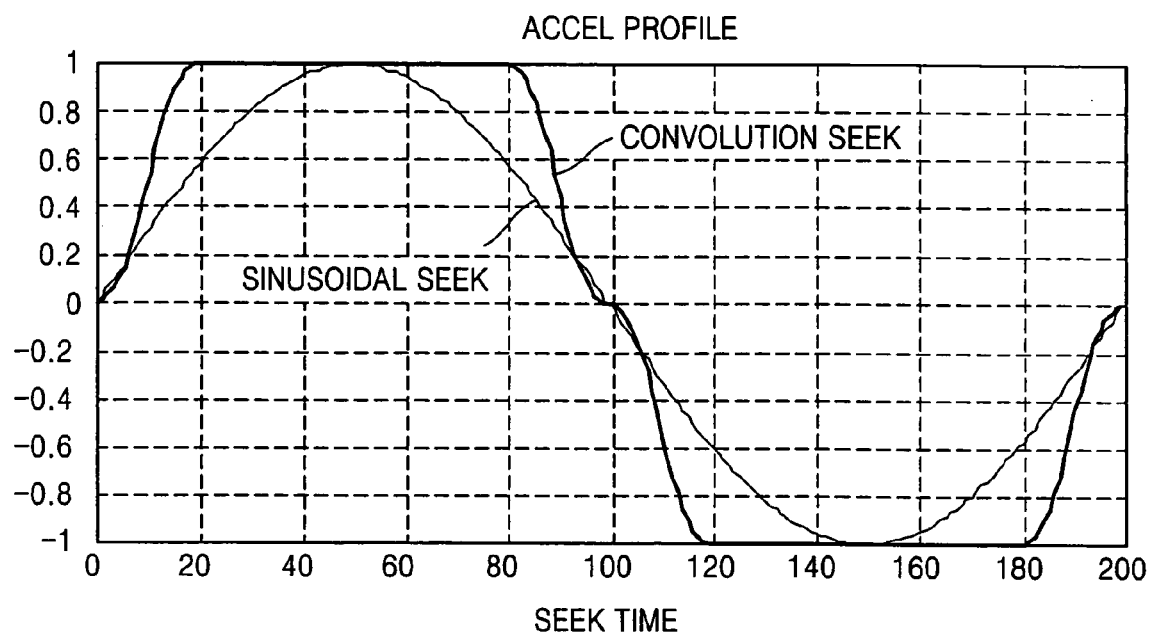
FIGS. 6A to 6D illustrate acceleration, velocity, position, and jerk trajectories obtained by applying Equation 8 to Equations 4, 6, and 7 according to the disclosed embodiment of the present invention.

A convolution seek acceleration trajectory function in FIG. 6A is obtained by setting c to 1 and m to 0.4 in Equation 8 and applying Equation 8 to Equations 4, 6, and 7.

As shown in FIG. 6A, there are coast regions of $20 \le n \le 80$ and $120 \le n \le 180$, where acceleration is constant. As a result, an applied current increases in comparison with the conventional method using the sinusoidal trajectory. The increase in the current leads to an increase in the track seek speed.

Figure 6B:
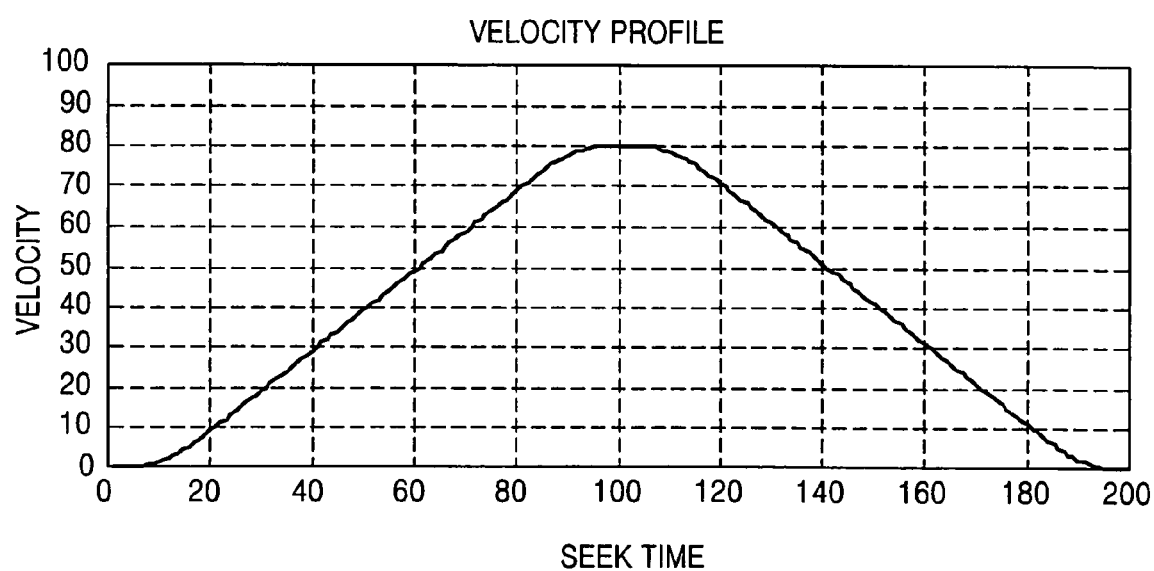
Figure 6C:
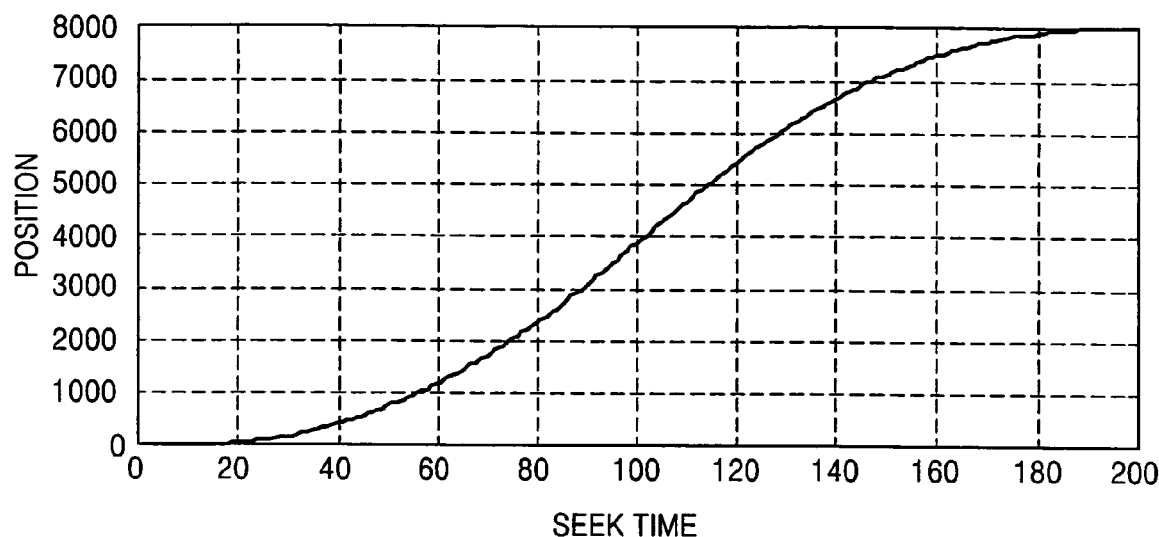

By integrating the convolution seek acceleration trajectory function show in FIG. 6A, a velocity trajectory can be obtained, as shown in FIG. 6B. By integrating the obtained velocity trajectory function, a position trajectory can be obtained, as shown in FIG. 6C. In addition, by differentiating the convolution seek acceleration trajectory function, a jerk trajectory can be obtained, as shown in FIG. 6D.

Figure 6D:
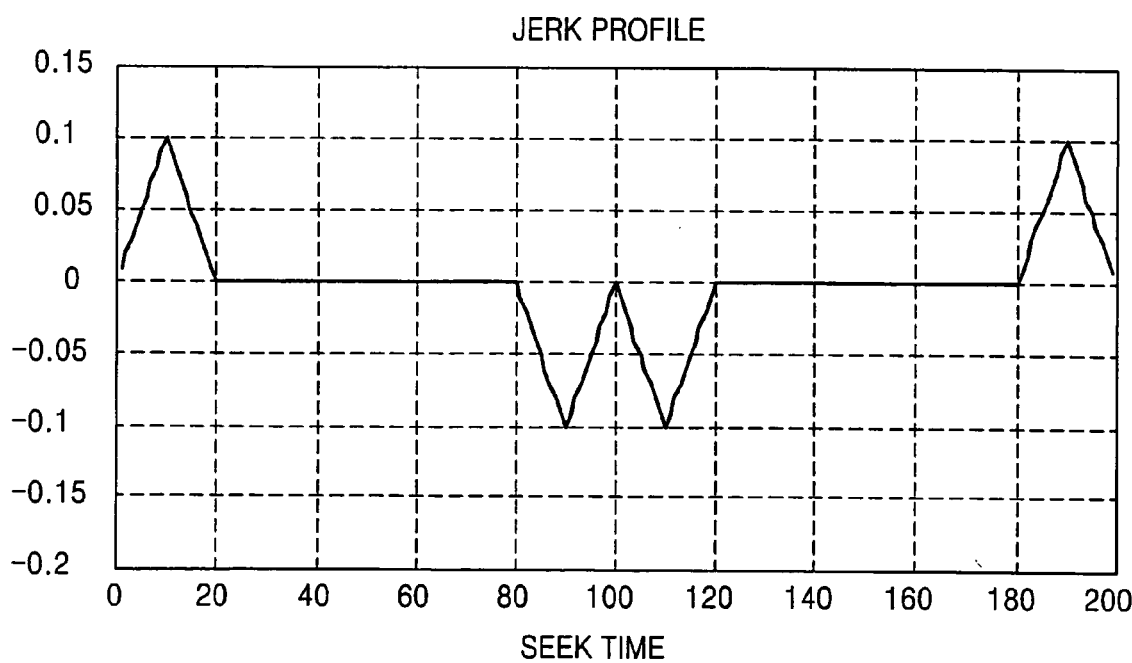

As shown in FIG. 6D, since the jerks at the beginning and end of a track seek have values of zero, it is possible to minimize acoustic noise and vibration by using the convolution seek acceleration trajectory.

Now, a track seek servo control apparatus in the hard disk drive usable with the disclosed embodiment of the present invention will be described.

FIG. 1 is a top view of the hard disk drive 10.

Referring to FIG. 1, the hard disk drive 10 includes at least one magnetic disk 12 which is rotated by a spindle motor 14. The hard disk drive 10 may also comprise a transducer 16 located adjacent to a surface of a disk 12.

The transducer 16 can write and read information to and from the rotating disk 12 by magnetizing the disk 12 and sensing the magnetic field of the disk 12, respectively. Typically, the transducer 16 is associated with the surface of each disk 12. Although a single transducer 16 is shown and described, it is to be understood that there may be a write transducer for magnetizing the disk 12 and a separate read transducer for sensing the magnetic field of the disk 12. The read transducer may be made of a magneto-resistive (MR) material.

The transducer 16 may be integrated into a slider 20. The slider 20 may be constructed to create an air bearing between the transducer 16 and the surface of the disk 12. The slider 20 may be incorporated into a head gimbal assembly (HGA) 22. The HGA 22 may be attached to an actuator arm 24 which has a voice coil 26. The voice coil 26 may be located adjacent to a magnet assembly 28 to define a voice coil motor (VCM) 30. Applying a current to the voice coil 26 will generate a torque for rotating the actuator arm 24 about a bearing assembly 32. Rotation of the actuator arm 24 moves the transducer 16 across the surface of the disk 12.

Information is typically stored within annular tracks 34 of the disk 12. Each track 34 typically contains a plurality of sectors. Each sector may include a data field and an identification field. The identification field may contain grey code information which identifies sectors and tracks (cylinders). The transducer 16 is moved across the surface of the disk 12 to write or read the information to or from a different track.

Now, the operation of an electronic system 40 of the hard disk drive 10 will be described.

Figure 2:
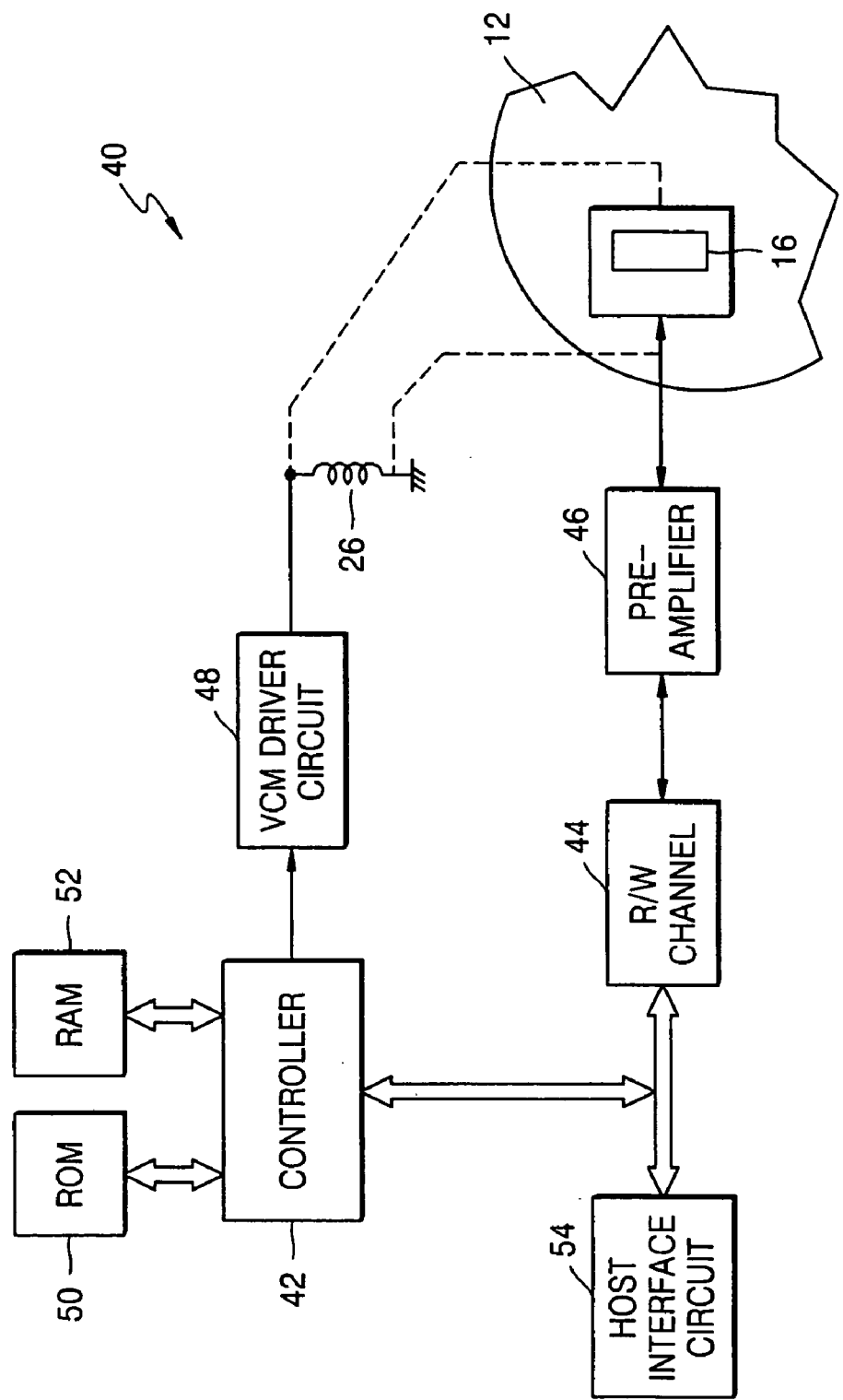
FIG. 2 is a schematic diagram of an electronic system for controlling the hard disk drive of FIG. 1.

FIG. 2 is a schematic diagram of an electronic system 40 for controlling the hard disk drive 10 of FIG. 1. The electronic system 40 includes a controller 42 coupled to the transducer 16 by a read/write (R/W) channel circuit 44 and a pre-amplifier circuit 46. Examples of the controller 42 may be a digital signal processor (DSP), a microprocessor, a microcontroller, etc. The controller 42 applies control signals to the read/write channel 44 in order to read/write information from/to the disk 12. The information is typically transmitted from the R/W channel 44 to a host interface circuit 54. The host interface circuit 54 includes a buffer memory and a control circuit which allow the hard disk drive 10 to interface with a system such as a personal computer.

The controller 42 is also coupled to a VCM driver circuit 48 which applies a driving current to the voice coil 26. The controller 42 applies control signals to the VCM driver circuit 48 to control the excitation of the VCM and the movement of the transducer 16.

The controller 42 is connected to a non-volatile memory device 50 such as a read only memory (ROM) device or a flash memory device, and a random access memory (RAM) device 52. The memory devices 50 and 52 contain commands and data used by the controller 42 to perform software routines. One of the software routines is a seek routine used to move the transducer 16 from one track to another track. The seek routine includes a servo control routine to ensure that the transducer 16 moves to a correct track. In one embodiment, the memory device 50 stores Equations 4, 6, 7, and 8 used to generate the acceleration, velocity, and position trajectories. As discussed below, the equations may be loaded into the memory device 52 at startup.

Figure 3:
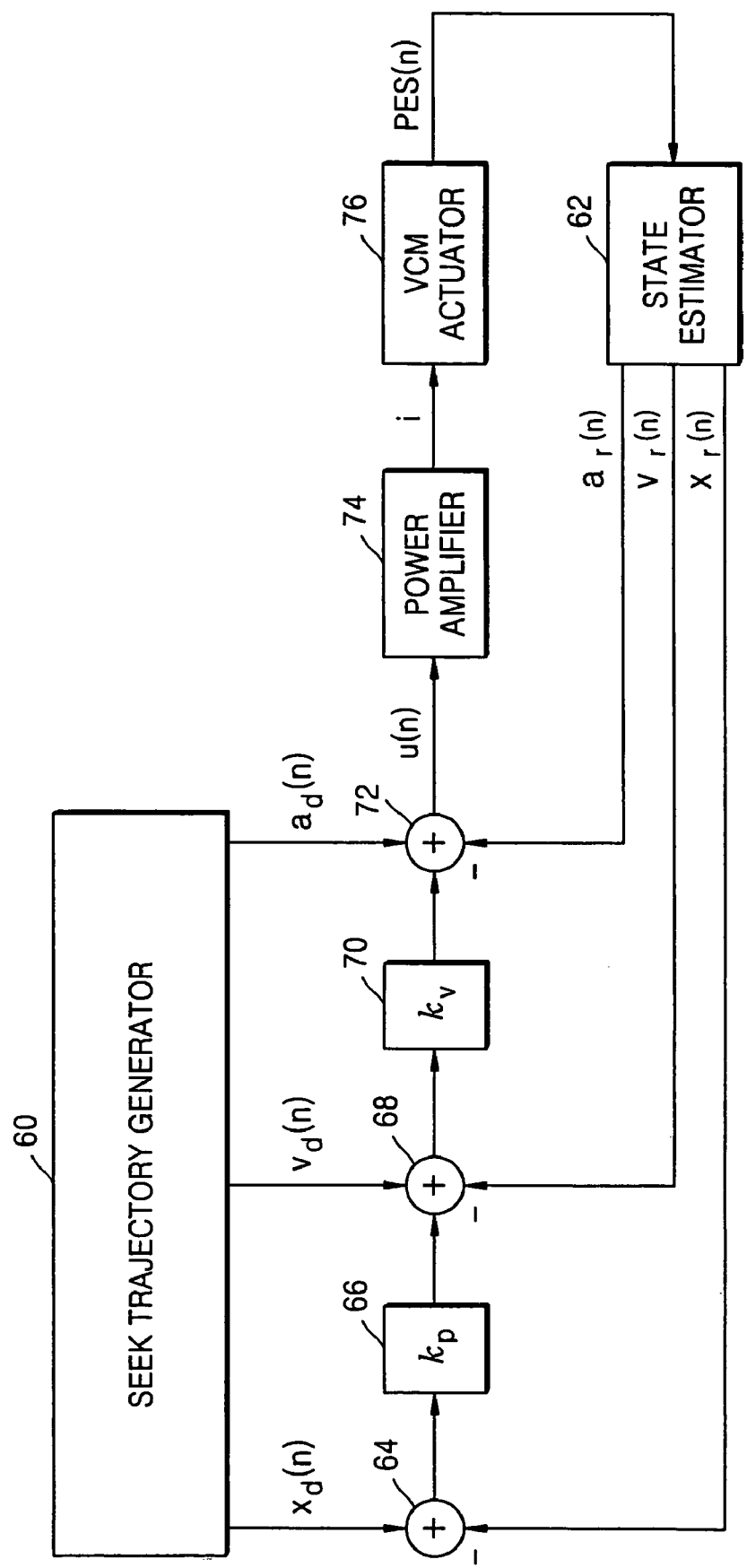
FIG. 3 is a schematic diagram of a track seek servo control system of the hard disk drive of FIG. 1 according to an embodiment of the present invention.

FIG. 3 is a schematic diagram of a track seek servo control system of the hard disk drive 10 of FIG. 1 according to an embodiment of the present invention. The track seek servo control system is executed by the aforementioned controller 42 of FIG. 2, and implemented in hardware and/or software. The track seek servo control system ensures that the transducer 16 is accurately located over a desired track of the disk 12 of FIG. 1. When the controller 42 performs the seek routine, the transducer 16 moves from a first track to a new track located at a distance $X_{SK}$ from the first track. The grey codes of one or more tracks located between the new and first tracks are read as the transducer 16 moves across the disk 12. This allows the controller 42 to periodically determine whether the transducer 16 of FIGS. 1 and 2 is moving at a desired speed and acceleration across the tracks.

The track seek servo control system includes a state estimator 62, which may be implemented in software and/or hardware. The state estimator 62 can determine a real distance or position $X_r(n)$ to which the transducer 16 of FIGS. 1 and 2 has moved from the first track. The real position $X_r(n)$ can be determined by reading the grey code of a track beneath the transducer 16. The state estimator 62 can also determine a real velocity $V_r(n)$ and a real acceleration $A_r(n)$ of the transducer 16. The grey codes can be periodically sampled as the transducer 16 moves to the new track location, so that the controller 42 can correct the movement of the transducer 16.

A seek trajectory generator 60 computes a design position $X_d(n)$, a design velocity $V_d(n)$ and a design acceleration $A_d(n)$ of the transducer 16 by using the acceleration trajectory derived form Equations 4, 6, 7, and 8, the velocity trajectory obtained by integrating the acceleration trajectory, and the position trajectory obtained by integrating the velocity trajectory, when the transducer reads the grey code of a track 34 of the disk 10 of FIG. 1.

In a first adder 64, the real position $x_r(n)$ is subtracted from the design position $x_d(n)$. In a position control gain corrector 66, a position correction value is generated by multiplying a position gain $k_p$ with a difference between the real position $x_r(n)$ and the design position $x_d(n)$ obtained in the first adder 64.

In a second adder 68, the real velocity $v_r(n)$ is subtracted from the sum of the design velocity $V_d(n)$ and the position correction value obtained in the position control gain corrector 66.

In a velocity control gain corrector 70, a velocity correction value is generated by multiplying a velocity gain $k_v$ with an output of the second adder 68.

In a third adder 72, an acceleration correction value u(n) is generated by subtracting the real acceleration $a_r(n)$ from the sum of the design acceleration $a_d(n)$ and the velocity correction value.

The acceleration correction value u(n) is amplified by the power amplifier 74. The amplified acceleration correction value is applied to a VCM actuator 76. The VCM actuator 76 varies a current applied to the voice coil in accordance with the acceleration correction value u(n), so that the acceleration of the motion of the transducer 16 can be changed. In addition, it can be seen that the acceleration trajectory has the same shape as the current waveform applied to the voice coil.

As shown in FIG. 6D, the jerk of the current applied to the voice coil has a value of zero at the beginning and end of a track seek in the track seek mode. In addition, as shown in FIG. 6A, there are coast regions within the acceleration and deceleration regions. As described above, in a coast region, the rate of change of acceleration is zero.

Figure 8:
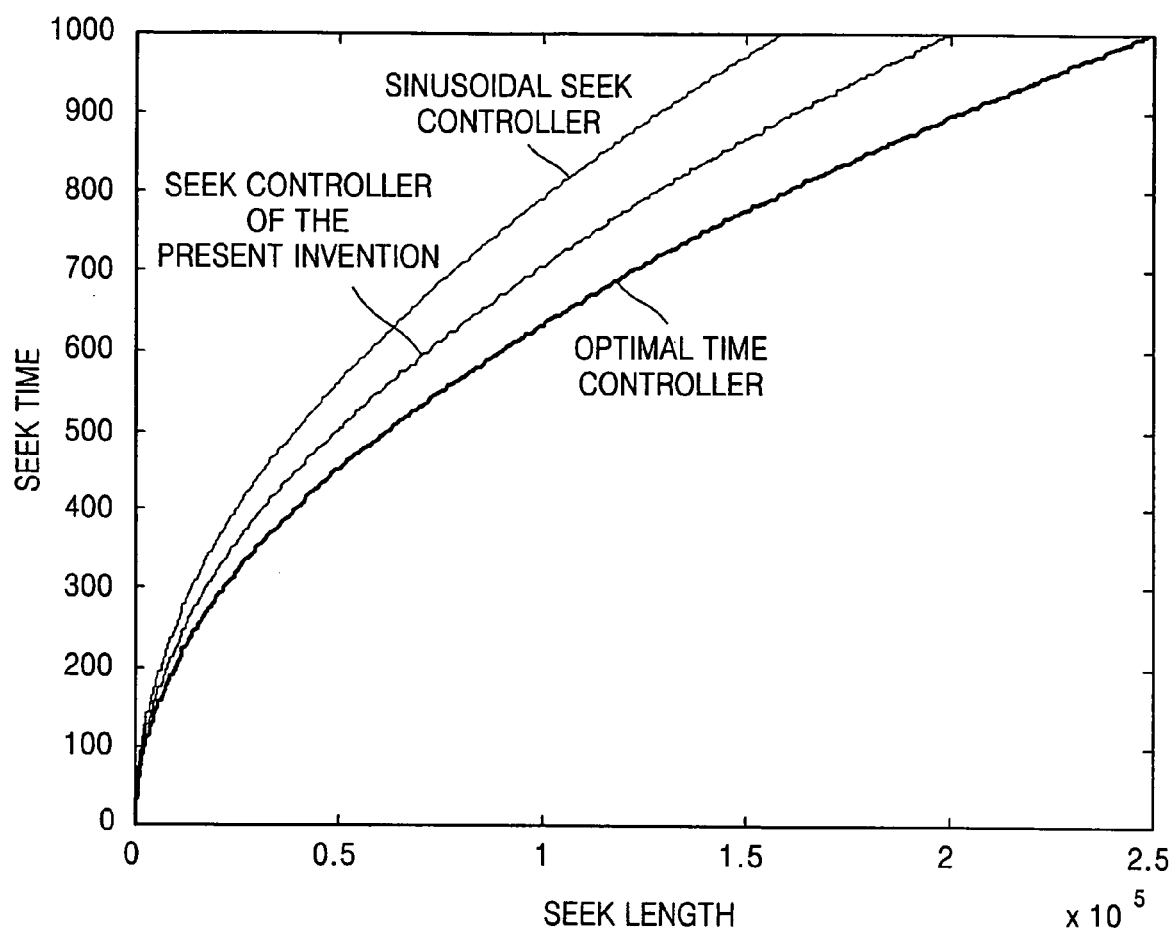
FIG. 8 illustrates seek performances of the disclosed embodiment of present invention and of the conventional art.

FIG. 8 illustrates seek performance, that is, seek time with respect to seek length, of an optimal time controller, that is, a "bang-bang" seek controller using a square waveform trajectory and a sinusoidal seek controller using a sinusoidal acceleration trajectory in the conventional art, and a seek controller using a convolution acceleration trajectory according to the present invention. As seen in FIG. 8, the seek performance, that is, the track seek speed, of the disclosed embodiment of the present invention is improved compared to the sinusoidal seek controller.

In addition, according to the present embodiment, the jerk at the beginning and end of a track seek has a value of zero and acoustic noise and vibration is reduced in comparison with the "band-bang" seek controller and the sinusoidal seek controller, as shown in FIG. 7.

According to the disclosed embodiment of the present invention, track seeking is controlled by using an acceleration trajectory obtained in a convolution operation during a track seek control process in a hard disk drive, so that jerks, that is, the rate of change of acceleration at the beginning and end of a track seek can have a value of zero. Therefore, the following advantages can be obtained. Firstly, it is possible to minimize acoustic noise and vibration. Secondly, it is possible to improve a track seek speed compared to a sinusoidal seek controller using a sinusoidal acceleration trajectory. Thirdly, it is possible to reduce a required capacity of a memory compared to the sinusoidal seek controller using the sinusoidal acceleration trajectory. Finally, it is possible to further increase operating speed during track seek control.

The disclosed embodiment of the present invention may be implemented as a method, apparatus, system, etc. When implemented in software, the elements of the present invention are essentially code segments to perform the necessary tasks. A program or code segments can be stored in a processor readable medium or transmitted by a computer data signal embodied in a carrier wave over a transmission medium or communication link. "Processor readable media" include any medium that can store or transfer information. Examples of processor readable media include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic wave, RF links, etc.

Although an embodiment of the present invention has been shown and described, the present invention is not limited to the described embodiment. Instead, it would be appreciated by those skilled in the art that changes may be made in the embodiment without departing from the principles and spirit of the invention, the scope of which is defined by the claims and their equivalents.

What is claimed is:

1. A method of controlling a track seek servo, comprising:
   moving a transducer to a track with an acceleration trajectory of a quarter of an overall acceleration trajectory corresponding to a track seek region generated by a convolution operation and an acceleration trajectory corresponding to a residual acceleration region generated by using a periodicity of an acceleration region corresponding to the quarter of the overall acceleration trajectory, a rate of change of acceleration of the transducer being zero at a beginning and an end of a track seek operation in a track seek mode wherein two signals are used in the convolution operation, the two signals being a step waveform signal and a symmetrical waveform signal, respectively.

2. The method of controlling a track seek servo according to claim 1, wherein the step waveform signal is a unit step waveform signal.

3. The method of controlling a track seek servo according to claim 1, wherein the symmetrical waveform signal is a triangular waveform signal.

4. The method of controlling a track seek servo according to claim 1, wherein an acceleration coast region is generated by modifying the sizes and periods of the two signals.

5. The method of controlling a track seek servo according to claim 1, wherein an overall seek time is divided into four seek time regions T1, T2, T3, and T4, and wherein acceleration trajectories $a_1[n]$, $a_2[n]$, $a_3[n]$, and $a4[n]$ corresponding to the four seek time regions T1, T2, T3, and T4 are obtained as follows:

$$a_1[n] = \sum_{k=0}^{n} x[k]h[n-k], 0 \le n \le T$$

$$a_2[n] = a_1[2T-n], T < n \le 2T$$

$$a_3[n] = -a_1[n-2T], 2T < n \le 3T$$

$$a_4[n] = -a_1[4T-n], 3T < n \le 4T$$

wherein $$x[n] = \begin{cases} c, & 0 \le n \le T \\ 0, & n < 0, n > T \end{cases}$$

$$h[n] = \begin{cases} n, & 0 \le n \le \frac{mT}{2} \\ mT - n, & \frac{mT}{2} < n \le mT \\ 0, & n < 0, n > mT \end{cases}$$

and wherein c is a positive constant, and m is a constant between 0 and 1.

6. The method of controlling a track seek servo according to claim 5, wherein c=1.

7. The method of controlling a track seek servo according to claim 6, wherein the function x[n] is a unit step function, and a product operation is not needed in the convolution operation.

8. A track seek servo control apparatus in a hard disk drive, the apparatus comprising:
a seek trajectory generator which generates an acceleration trajectory of a quarter of an overall acceleration trajectory corresponding to a track seek region by using a convolution operation and an acceleration trajectory corresponding to a residual acceleration region by using a periodicity of an acceleration region corresponding to the quarter of the overall acceleration trajectory, so that a rate of change of acceleration is zero at a beginning and an end of a track seek operation in a track seek mode, and which computes a design position, a velocity, and an acceleration by using the acceleration trajectory;
a state estimator which determines a real position, a velocity, and an acceleration of a transducer moving over a disk;
a first adder which subtracts the real position from the design position;
a position control gain corrector which generates a position correction value by multiplying a specified position gain with an output of the first adder;
a second adder which subtracts the real velocity from the sum of the design velocity and the position correction value;
a velocity control gain corrector which generates a velocity correction value by multiplying a specified velocity gain with an output of the second adder;
a third adder which generates an acceleration correction value by subtracting the real acceleration from the sum of the design acceleration and the velocity correction value; and
an actuator which varies a current applied to a voice coil in accordance with the acceleration correction value wherein two signals are used in the convolution operation, the two signals being a step waveform signal and a symmetrical waveform signal, respectively.

9. The track seek servo control apparatus according to claim 8, wherein the step waveform signal is a unit step waveform signal.

10. The track seek servo control apparatus according to claim 8, wherein an acceleration coast region is generated by modifying the sizes and periods of the two signals.

11. A hard disk drive comprising:
an actuator which moves a transducer across a surface of a disk; and
a controller which controls the actuator to move the transducer to a track with an acceleration trajectory of a quarter of an overall acceleration trajectory corresponding to a track seek region generated by a convolution operation and an acceleration trajectory corresponding to a residual acceleration region generated by using a periodicity of an acceleration region corresponding to the quarter of the overall acceleration trajectory so that a rate of change of acceleration is zero at a beginning and an end of a track seek operation in a track seek mode wherein two signals are used in the convolution operation, the two signals being a step waveform signal and a symmetrical waveform signal, respectively.

12. A method of controlling a track seek servo, comprising:
moving a transducer to a track by a track seek control process for applying a current to a voice coil,
wherein the current corresponds to an acceleration trajectory of a quarter of an overall acceleration trajectory corresponding to a track seek region generated by a convolution operation and an acceleration trajectory corresponding to a residual acceleration region generated by using a periodicity of an acceleration region corresponding to the quarter of the overall acceleration trajectory, so that a rate of change of acceleration is zero at a beginning and an end of a track seek operation in a track seek mode wherein two signals are used in the convolution operation, the two signals being a step waveform signal and a symmetrical waveform signal, respectively.

13. The method of controlling a track seek servo according to claim 12, wherein the step waveform signal is a unit step waveform signal.

14. The method of controlling a track seek servo according to claim 12, wherein an acceleration coast region is generated by modifying the sizes and periods of the two signals used in the convolution operation.

15. A hard disk drive comprising:
an actuator which moves a transducer across a surface of a disk; and
a controller which controls the actuator to move the transducer to a track by applying a current to a voice coil, wherein the current corresponds to an acceleration trajectory of a quarter of an overall acceleration trajectory corresponding to a track seek region generated by a convolution operation and an acceleration trajectory corresponding to a residual acceleration region generated by using a periodicity of an acceleration region corresponding to the quarter of the overall acceleration trajectory, so that a rate of change of acceleration is zero at a beginning and an end of a track seek operation in a track seek mode wherein two signals are used in the convolution operation, the two signals being a step waveform signal and a symmetrical waveform signal, respectively.

16. A method of track seeking in a hard disk drive, comprising:
generating an acceleration trajectory of a quarter of an overall acceleration trajectory corresponding to a track seek region via a convolution operation during a track seeking operation in the hard disk drive;
generating an acceleration trajectory corresponding to a residual acceleration region using a periodicity of an acceleration region corresponding to the quarter of the overall acceleration trajectory; and
moving a transducer to a specified track of a disk according to the acceleration trajectory, the acceleration trajectory dictating that a rate of change of acceleration at a beginning and an end of a track seeking operation is zero wherein two signals are used in the convolution operation, the two signals being a step waveform signal and a symmetrical waveform signal, respectively.

17. A method of increasing a speed of a track seeking operation, comprising:
moving a transducer to a track of a disk according to an acceleration trajectory generated by a convolution operation, the acceleration trajectory dictating that a rate of change of acceleration of the transducer is zero at a beginning and an end of a track seek operation, the convolution operation including the summing of products of two discrete signals x[n] and h[n]; and
modifying the two signals x[n] and h[n] according to the following:

$$x[n] = \begin{cases} c, & 0 \leq n \leq T \\ 0, & n < 0, n > T \end{cases}$$

$$h[n] = \begin{cases} n, & 0 \leq n \leq \frac{mT}{2} \\ mT - n, & \frac{mT}{2} < n \leq mT \\ 0, & n < 0, n > mT \end{cases},$$

wherein c is a positive constant, and m is a constant between 0 and 1.

18. A method of minimizing noise during a seek servo tracking operation, comprising:
generating an acceleration trajectory of a quarter of an overall acceleration trajectory corresponding to a track seek region by a convolution operation and an acceleration trajectory corresponding to a residual acceleration region using a periodicity of an acceleration region corresponding to the quarter of the overall acceleration trajectory, so that a rate of change of acceleration is zero at a beginning and an end of a track seek operation in a track seek mode;
computing a design position, a velocity, and an acceleration by using the acceleration trajectory;
determining a real position, a real velocity, and a real acceleration of a transducer moving over a disk;
subtracting the real position from the design position to obtain a first output value;
generating a position correction value by multiplying a specified position gain with the first output value;
subtracting the real velocity from the sum of the design velocity and the position correction value to obtain a second output value;
generating a velocity correction value by multiplying a specified velocity gain with the second output value;
generating an acceleration correction value by subtracting the real acceleration from the sum of the design acceleration and the velocity correction value; and
varying a current applied to a voice coil in accordance with the acceleration correction value wherein two signals are used in the convolution operation, the two signals being a step waveform signal and a symmetrical waveform signal, respectively.

19. A computer-readable storage medium encoded with processing instructions for causing a computer to execute a method of controlling a track seek servo, the method comprising:
moving a transducer to a track with an acceleration trajectory of a quarter of an overall acceleration trajectory corresponding to a track seek region generated by a convolution operation and an acceleration trajectory corresponding to a residual acceleration region generated by using a periodicity of an acceleration region corresponding to the quarter of the overall acceleration trajectory, a rate of change of acceleration of the transducer being zero at a beginning and an end of a track seek operation in a track seek mode wherein two signals are used in the convolution operation, the two signals being a step waveform signal and a symmetrical waveform signal, respectively.

20. A computer-readable storage medium encoded with processing instructions for causing a computer to execute a method of controlling a track seek servo, the method comprising: moving a transducer to a track by a track seek control process for applying a current to a voice coil,
wherein the current corresponds to an acceleration trajectory of a quarter of an overall acceleration trajectory corresponding to a track seek region generated by a convolution operation and an acceleration trajectory corresponding to a residual acceleration region generated by using a periodicity of an acceleration region corresponding to the quarter of the overall acceleration trajectory, so that a rate of change of acceleration is zero at a beginning and an end of a track seek operation in a track seek mode wherein two signals are used in the convolution operation, the two signals being a step waveform signal and a symmetrical waveform signal, respectively.

21. A computer-readable storage medium encoded with processing instructions for causing a computer to execute a method of track seeking in a hard disk drive, the method comprising:
generating an acceleration trajectory of a quarter of an overall acceleration trajectory corresponding to a track seek region by a convolution operation and an acceleration trajectory corresponding to a residual acceleration region using a periodicity of an acceleration region corresponding to the quarter of the overall acceleration trajectory during a track seeking operation in the hard disk drive; and moving a transducer to a specified track of a disk according to the acceleration trajectory, the acceleration trajectory dictating that a rate of change of acceleration at a beginning and an end of a track seeking operation is zero wherein two signals are used in the convolution operation, the two signals being a step waveform signal and a symmetrical waveform signal, respectively.

22. A computer-readable storage medium encoded with processing instructions for causing a computer to execute a method of increasing a speed of a track seeking operation, the method comprising:

moving a transducer to a track of a disk according to an acceleration trajectory generated by a convolution operation, the acceleration trajectory dictating that a rate of change of acceleration of the transducer is zero at a beginning and an end of a track seek operation, the convolution operation including the summing of products of two discrete signals $x[n]$ and $h[n]$; and modifying the two signals $x[n]$ and $h[n]$ according to the following:

$$x[n] = \begin{cases} c, & 0 \leq n \leq T \\ 0, & n < 0, n > T \end{cases}$$

$$h[n] = \begin{cases} n, & 0 \leq n \leq \frac{mT}{2} \\ mT - n, & \frac{mT}{2} < n \leq mT \\ 0, & n < 0, n > mT \end{cases},$$

wherein c is a positive constant, and m is a constant between 0 and 1.

23. A computer-readable storage medium encoded with processing instructions for causing a computer to execute a method of minimizing noise during a seek servo tracking operation, the method comprising:

generating an acceleration trajectory of a quarter of an overall acceleration trajectory corresponding to a track seek region by a convolution operation and an acceleration trajectory corresponding to a residual acceleration region using a periodicity of an acceleration region corresponding to the quarter of the overall acceleration trajectory so that a rate of change of acceleration is zero at a beginning and an end of a track seek operation in a track seek mode;

computing a design position, a velocity, and an acceleration by using the acceleration trajectory;

determining a real position, a real velocity and a real acceleration of a transducer moving over a disk;

subtracting the real position from the design position to obtain a first output value;

generating a position correction value by multiplying a specified position gain with the first output value;

subtracting the real velocity from the sum of the design velocity and the position correction value to obtain a second output value;

generating a velocity correction value by multiplying a specified velocity gain with the second output value;

generating an acceleration correction value by subtracting the real acceleration from the sum of the design acceleration and the velocity correction value; and varying a current applied to a voice coil in accordance with the acceleration correction value wherein two signals are used in the convolution operation, the two signals being a step waveform signal and a symmetrical waveform signal, respectively.

* * * * *

UNITED STATES PATENT AND TRADEMARK OFFICE
CERTIFICATE OF CORRECTION

PATENT NO. : 7,289,290 B2  Page 1 of 1
APPLICATION NO. : 10/968126
DATED : October 30, 2007
INVENTOR(S) : Sang-cheol Lee It is certified that error appears in the above-identified patent and that said Letters Patent is hereby corrected as shown below:

Column 10, Line 64, Claim 1, after "mode" insert --,--.

Column 12, Line 15, Claim 8, after "value" insert --,--.

Column 12, Line 38, Claim 11, after "mode" insert --,--.

Column 12, Line 55, Claim 12, after "mode" insert --,--.

Column 13, Line 15, Claim 15, after "mode" insert --,--.

Column 13, Line 33, Claim 16, after "zero" insert --,--.

Column 14, Line 22, Claim 18, after "value" insert --,--.

Column 14, Line 39, Claim 19, after "mode" insert --,--.

Column 14, Line 57, Claim 20, after "mode" insert --,--.

Column 15, Line 10, Claim 21, after "zero" insert --,--.

Column 16, Line 16, Claim 23, after "velocity" insert --,--.

Column 16, Line 31, after "value" insert --,--.

Signed and Sealed this

Twenty-ninth Day of April, 2008

JON W. DUDAS
*Director of the United States Patent and Trademark Office*